(12) United States Patent
Nurminen et al.

(10) Patent No.: US 8,086,057 B2
(45) Date of Patent: Dec. 27, 2011

(54) DYNAMIC QUANTIZER STRUCTURES FOR EFFICIENT COMPRESSION

(75) Inventors: Jani Nurminen, Lempäälä (FI); Sakari Himanen, Tampere (FI)

(73) Assignee: Nokia Corporation, Espoo (FI)

( * ) Notice: Subject to any disclaimer, the term of this patent is extended or adjusted under 35 U.S.C. 154(b) by 1096 days.

(21) Appl. No.: 11/855,778

(22) Filed: Sep. 14, 2007

(65) Prior Publication Data

US 2008/0107348 A1    May 8, 2008

Related U.S. Application Data

(60) Provisional application No. 60/857,013, filed on Nov. 6, 2006.

(51) Int. Cl.
*G06K 9/00* (2006.01)
(52) U.S. Cl. .................................. 382/251; 382/232
(58) Field of Classification Search .................. 382/232, 382/238, 239, 243, 245, 251, 176; 375/242, 375/245, E7.087, E7.129, 240.01, 240.02
See application file for complete search history.

(56) References Cited

U.S. PATENT DOCUMENTS

| | | | |
|---|---|---|---|
| 6,625,323 B2 * | 9/2003 | Henderson et al. | 382/251 |
| 7,206,457 B2 * | 4/2007 | Lee et al. | 382/243 |
| 7,809,203 B2 * | 10/2010 | Lee et al. | 382/243 |
| 7,809,204 B2 * | 10/2010 | Lee et al. | 382/243 |
| 2005/0240398 A1 | 10/2005 | Chen | |

FOREIGN PATENT DOCUMENTS

| | | |
|---|---|---|
| CN | 1835595 A | 9/2006 |
| EP | 0615346 | 9/1994 |
| EP | 0917104 A2 | 5/1995 |
| EP | 0917104 A2 | 5/1999 |
| WO | WO 0111609 | 2/2001 |

OTHER PUBLICATIONS

International Search report for PCT Patent Application No. PCT/IB2007/053601, Apr. 2, 2008.
European Search Report for EP Application07826294.6, dated Nov. 29, 2010.
Korean Office Action for Korean Patent Application No. 2009-7011646, dated Nov. 23, 2010.
English Translation of Korean Office Action for Korean Patent Application No. 2009-7011646, dated Nov. 23, 2010.
Chinese Office Action for Chinese Patent Application No. 2007-80041139.9, dated Mar. 23, 2011.

(Continued)

*Primary Examiner* — Anh Hong Do
(74) *Attorney, Agent, or Firm* — AlbertDhand LLP

(57) ABSTRACT

A method and system are introduced that provide dynamic quantizer structures which are configurable during run time. A quantizer configuration and data are stored in a binary format. The dynamic quantizer data is represented as a bit-stream, and the bitstream in turn is used as additional input during initialization (or re-initialization/re-configuration) of a speech coder. A configuration header fully specifies the structure and configuration of the dynamic quantizer for each quantized parameter, and the dynamic quantizer data and configurations are fully and dynamically allocated into the speech coder memory. This enables easy re-configuration of a codec associated with the quantizer structures for different scenarios. The use of dynamic quantizer structures in turn enhances compression efficiency of an input signal. The dynamic quantizer structures can also be applied to other compression applications that allow lossy compression.

27 Claims, 5 Drawing Sheets

OTHER PUBLICATIONS

English Translation of Chinese Office Action for Chinese Patent Application No. 2007-80041139.9, dated Mar. 23, 2011.
European Search Report for EP Application 07826294.6, dated Nov. 29, 2010.
Rejection Decision for Chinese Patent Application No. 200780041139.9, dated Oct. 10, 2011.
English translation of Rejection Decision for Chinese Patent Application No. 200780041139.9, dated Oct. 10, 2011.

* cited by examiner

DYNAMIC QUANTIZER STRUCTURES FOR EFFICIENT COMPRESSION

CROSS REFERENCE TO RELATED APPLICATIONS

The present application claims priority to U.S. Provisional Patent Application No. 60/857,013, filed Nov. 6, 2006 and incorporated herein by reference in its entirety.

FIELD OF THE INVENTION

The present invention relates generally to data compression. More particularly, the present invention relates to dynamic and configurable quantizer structures for use in data compression applications.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Quantization generally refers to a process in digital signal processing, where a continuous range of values, for example, are approximated by a smaller set of discrete symbols or integer values. A common use of quantization is in lossy data compression. An example of a lossy compression system that utilizes quantization is Joint Photographic Experts Group (JPEG) image compression. During JPEG encoding, data representing an image is processed using a discrete cosine transform. The image data is quantized and entropy encoded. By using quantization, the precision of transformed image data values are reduced, and thus, the number of bits needed to represent the image can be reduced. For example, images can be represented with acceptable quality using JPEG at less than 3 bits per pixel, where before JPEG compression, 24 bits per pixel are typically needed to represent an image.

Another common example of lossy compression is seen with the digital transmission of speech signals. Conventionally, digitally transmitting speech signals involves sampling an analog speech waveform with an analog-to-digital converter, speech compression (i.e., encoding), transmission, speech decompression (i.e., decoding), digital-to-analog conversion, and playback into an earpiece or a loudspeaker. Speech compression, like JPEG compression, may be used to reduce the number of bits used to represent a speech signal.

Speech compression systems known as codecs utilize various algorithms to encode the original speech while attempting to maintain high quality reconstructed speech. Conventionally, an input speech signal, or its parametric representation, is compressed and quantized using a quantizer. Quantization, as described above, refers to a process that maps inputs, such as for example, various speech parameters that comprise a speech signal, within a specified range to a common value. In other words, speech coding involves forming an alternative representation of speech using a set of parameters, wherein the quantization is performed on a corresponding parametric vector(s) and/or scalar values. Inputs in different ranges are mapped to different common values. A quantization partition defines a plurality of contiguous, non-overlapping ranges of values within a set of real numbers representing the input speech signal. A codebook is utilized to tell the quantizer which common value to assign to inputs that fall within each range of the partition, where each common value of the codebook is commonly referred to as a codeword.

The quantizer itself can be thought of as comprising an encoder and a decoder for quantizing and dequantizing, respectively, where the encoder receives an input signal and outputs an index of its associated codeword. Various methods can be used to identify a proper codeword to be associated with the input signal. The decoder, upon receipt of the index or indices, converts them to corresponding codewords, where the codewords are output as quantized values representing the original input signal.

These speech compression techniques have resulted in lowering the amount of bandwidth used to transmit a speech signal. However, as described above, quantizers and their codebooks have traditionally been fixed in terms of their structure and size e.g., current speech coders used in mobile environments utilize fixed codebooks stored in memory during a build process. Furthermore, most speech coder binaries and their quantizers are stored in the ROM storage of mobile devices. As a consequence, the current speech coders are not truly flexible, and updating the quantizers becomes a difficult task.

SUMMARY OF THE INVENTION

The various embodiments of the present invention allow a quantizer configuration and data to be stored in a binary format, where the binary formatted data in turn is used as additional input during initialization (or re-initialization/re-configuration) of a speech coder. A configuration header included in the binary data fully specifies the structure and configuration of the dynamic quantizer for each quantized parameter, and the dynamic quantizer data and the respective configurations are completely allocated in a dynamic way into speech coder memory.

The dynamic quantizer structures configured according to the various embodiments of the present invention can be made more flexible in such a way that the dynamic quantizers can utilize different processing methods and/or systems for different types of input data. In addition, several different predictive and/or memoryless quantizer modes can be utilized depending upon the type of speech data encountered, and these different predictive and/or memoryless quantizer modes can be used with different types of predictors. Lastly, sub-quantizer data can be either unique or shared between different quantizers, while the sub-quantizers themselves can contain codebooks with one or more stages.

With various embodiments of the present invention, speech coder output quality can be maximized in applications where codebook data can be stored in addition to the actual binary formatted data, and run-time updating of quantizers is made possible. In addition, each parameter's quantizer can be updated independently, as well as the respective sub-quantizers. Different predictive and/or non-predictive modes can be utilized, and the updating of codebooks is not fixed into any build configuration. Updates for ROM-based codecs are enabled without a need to re-program the flash memory of the device, and downloadable codec update is also possible.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
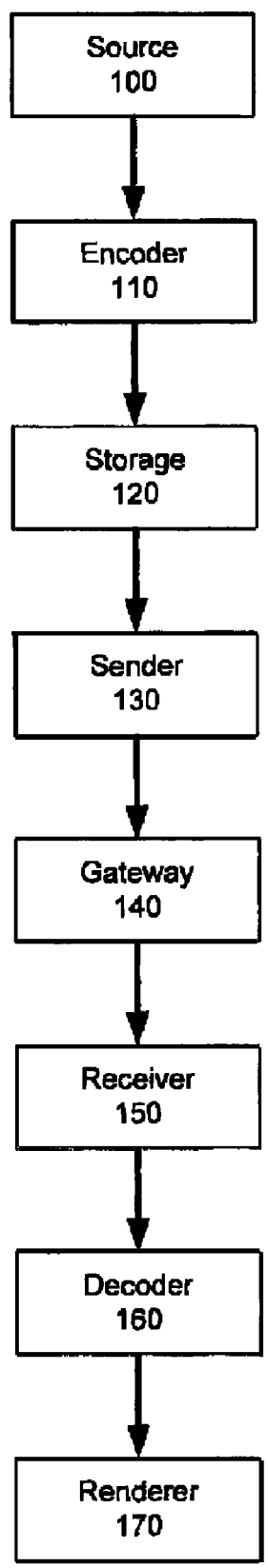
FIG. 1 shows a generic multimedia communications system for use with the present invention.

FIG. 1 shows a generic multimedia communications system for use with the present invention. As shown in FIG. 1, a data source 100 provides a source signal in an analog, uncompressed digital, or compressed digital format, or any combination of these formats. An encoder 110 encodes the source signal into a coded media bitstream. The encoder 110 may be capable of encoding more than one media type, such as speech, audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 110 is considered to simplify the description without a lack of generality.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to a sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the sender 130 may reside in the same physical device or they may be included in separate devices. The encoder 110 and the sender 130 may operate with live real-time content, in which case the coded media bitstream is typically not stored permanently, but rather buffered for small periods of time in the content encoder 110 and/or in the sender 130 to smooth out variations in processing delay, transfer delay, and coded media bitrate.

The sender 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 130 encapsulates the coded media bitstream into packets. For example, when RTP is used, the sender 130 encapsulates the coded media bitstream into RTP packets according to an RTP payload format. Typically, each media type has a dedicated RTP payload format. It should be again noted that a system may contain more than one sender 130, but for the sake of simplicity, the following description only considers one sender 130.

The sender 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer and acts as an endpoint of an RTP connection.

The system includes one or more receivers 150, typically capable of receiving, de-modulating, and de-capsulating the transmitted signal into a coded media bitstream. The coded media bitstream is typically processed further by a decoder 160, whose output is one or more uncompressed media streams. Finally, a renderer 170 may reproduce the uncompressed media streams with a speaker or a display, for example. The receiver 150, the decoder 160, and the renderer 170 may reside in the same physical device or they may be included in separate devices.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
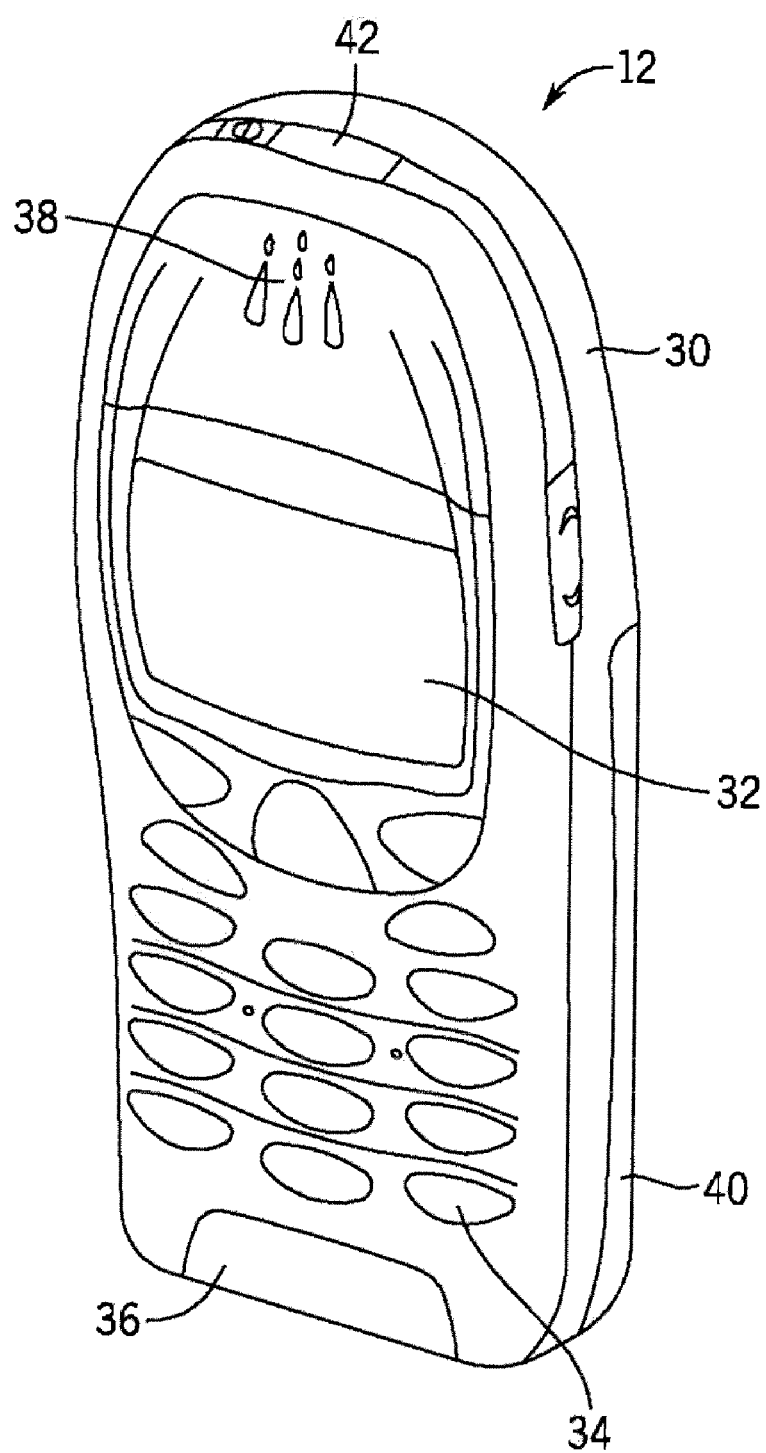
FIG. 2 is a perspective view of a mobile telephone that can be used in the implementation of the present invention.
Figure 3:
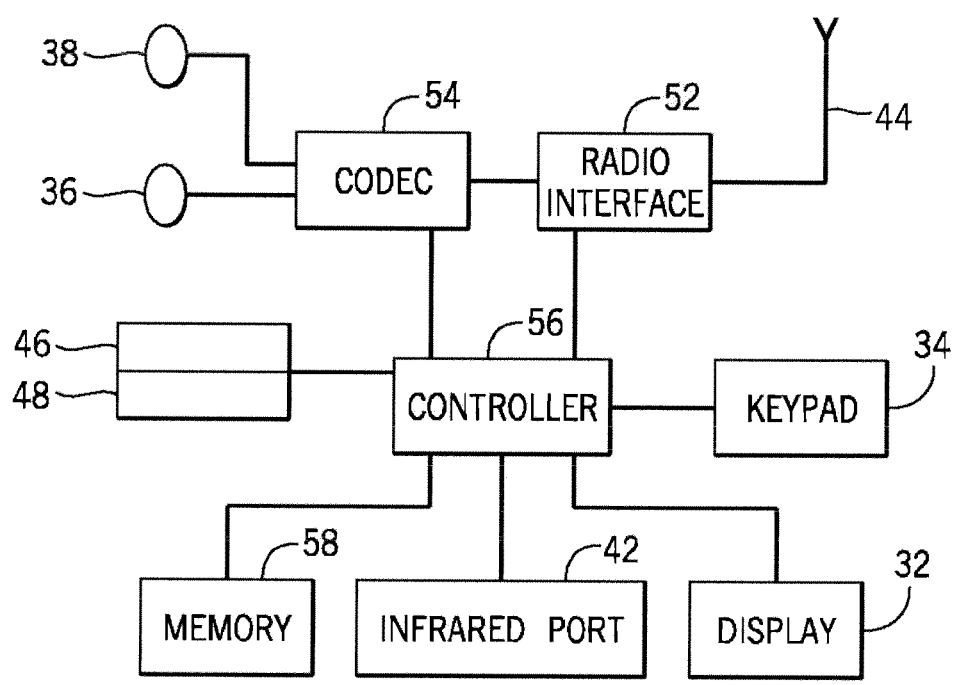
FIG. 3 is a schematic representation of the telephone circuitry of the mobile telephone of FIG. 2.

FIGS. 2 and 3 show one representative mobile device 12 within which the present invention may be implemented. It should be understood, however, that the present invention is not intended to be limited to one particular type of mobile device 12 or other electronic device. Some or all of the features depicted in FIGS. 2 and 3 could be incorporated into any or all of the devices represented in FIG. 1.

The mobile device 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile devices.

The various embodiments of the present invention provide quantizer structures that are dynamic and configurable during run time. This enables easy re-configuration of a codec associated with the quantizer structures for different scenarios. The use of dynamic quantizer structures in turn enhances compression efficiency of an input signal. The various embodiments of the present invention can be used in speech compression and synthesis solutions for adapting a codec for different text-to-speech voices in an efficient manner. However, it should be noted that the dynamic quantizer structures can be applied to other compression applications that allow lossy compression.

The quantizer structures configured according to the various embodiments of the present invention are made flexible in such a way that: 1) The quantizers can utilize different processing methods and/or systems for different types of input data; 2) Several different predictive and/or memoryless quantizer modes can be utilized depending upon the type of speech data encountered. It should be noted that these different predictive and/or memoryless quantizer modes can be used with different types of predictors; 3) Sub-quantizer data can be either unique or shared between different quantizers; and 4) The sub-quantizers can contain codebooks with one or more stages or parts. It should be noted that a plurality of possible predictors may be assigned to any given codebook, although the term "codebook" is herein utilized in a broader sense.

The dynamic quantizer data is represented in a binary format. The binary format is used as additional data during an initialization process of a speech coder. In addition, the dynamic quantizer data can be updated during run-time processing of the speech coder if needed. The quantizer configuration is stored as a specific configuration header that may precede the actual codebook data in the binary format. Alternatively, other data such as the codebook data, can precede the quantizer configuration, or these data can be interleaved. The configuration header specifies the quantizer structure and configuration for each quantized parameter included in the configuration.

The dynamic quantizer data and configuration are fully and dynamically allocated into speech coder memory. This enables the following benefits: (1) The speech coder may have an initial codebook configuration, i.e., a default configuration; (2) The dynamic quantizer configuration does not need to contain codebooks for all of the relevant parameters; (3) Each sub-quantizer may be updated individually by re-loading relevant data; and (4) Each parameter may use the same codebooks and/or predictors for different segment types within a single memory instance, where the term segment type refers to different modes of operation for different types of input data. It should be noted that the different segment types depend upon a particular type of speech that is being quantized and/or otherwise being processed.

Figure 4:
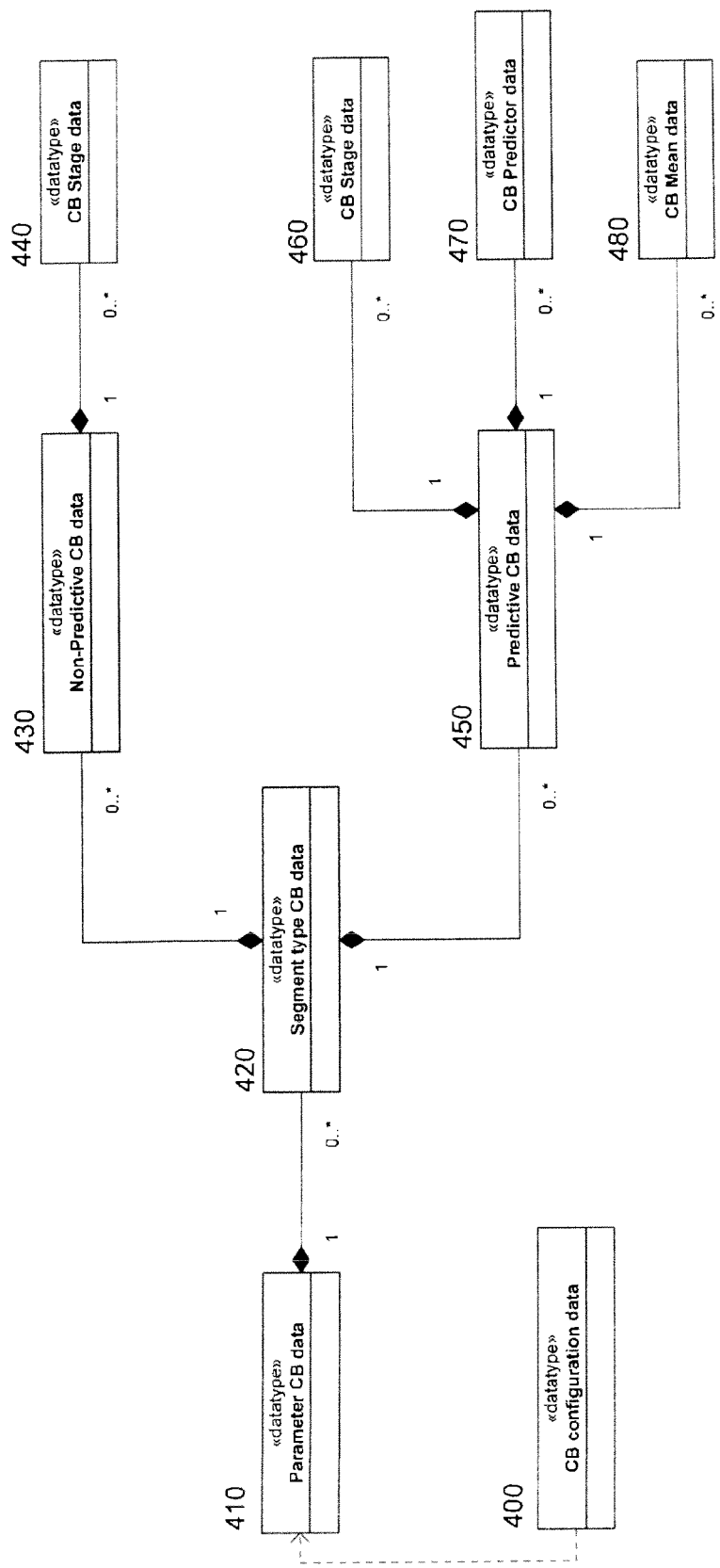
FIG. 4 is a representation of a data structure according to one embodiment of the present invention.

An example of organizing data according to one embodiment of the present invention is shown in FIG. 4. As discussed above, the speech coder may have initial codebook (CB) configuration data 400. The configuration header contains for each speech parameter, various pieces of information, including an inclusion flag for each parameter. As discussed above, each parameter may use the same codebooks, i.e., parameter CB data 410, for different segment types with a single memory instance. Therefore, a common codebook for all segment types flag is also included in the configuration header. In addition, a segment type inclusion flag referring to segment type CB data 420 is included. For each segment type, a number of non-predictive modes associated with non-predictive CB data 430 and a number of predictive modes associated with predictive CB data 450 are included therein. For each non-predictive mode, a number of stages associated with CB stage data 440 is included. For each stage, a stage size in bits is included therein. Furthermore, the predictive CB data 450 is associated with CB stage data 460, CB predictor data 470, and CB mean data 480.

The configuration header is stored in a binary format as also shown in FIG. 4, and parsed in the beginning of the dynamic quantizer initialization. After parsing the dynamic quantizer configuration, actual quantizer data can be read from the binary formatted data and placed into a correct memory structure.

It should be noted that the specific details of the various embodiments of the present invention (e.g., the actual file format) can be varied as long as certain principles are maintained in the foreseeable variants, i.e., the use of dynamic quantizers, the quantizers are represented in a binary format, and the binary format consists of both the configuration data and the quantizer data to be updated (including predictor data if necessary).

Figure 5:
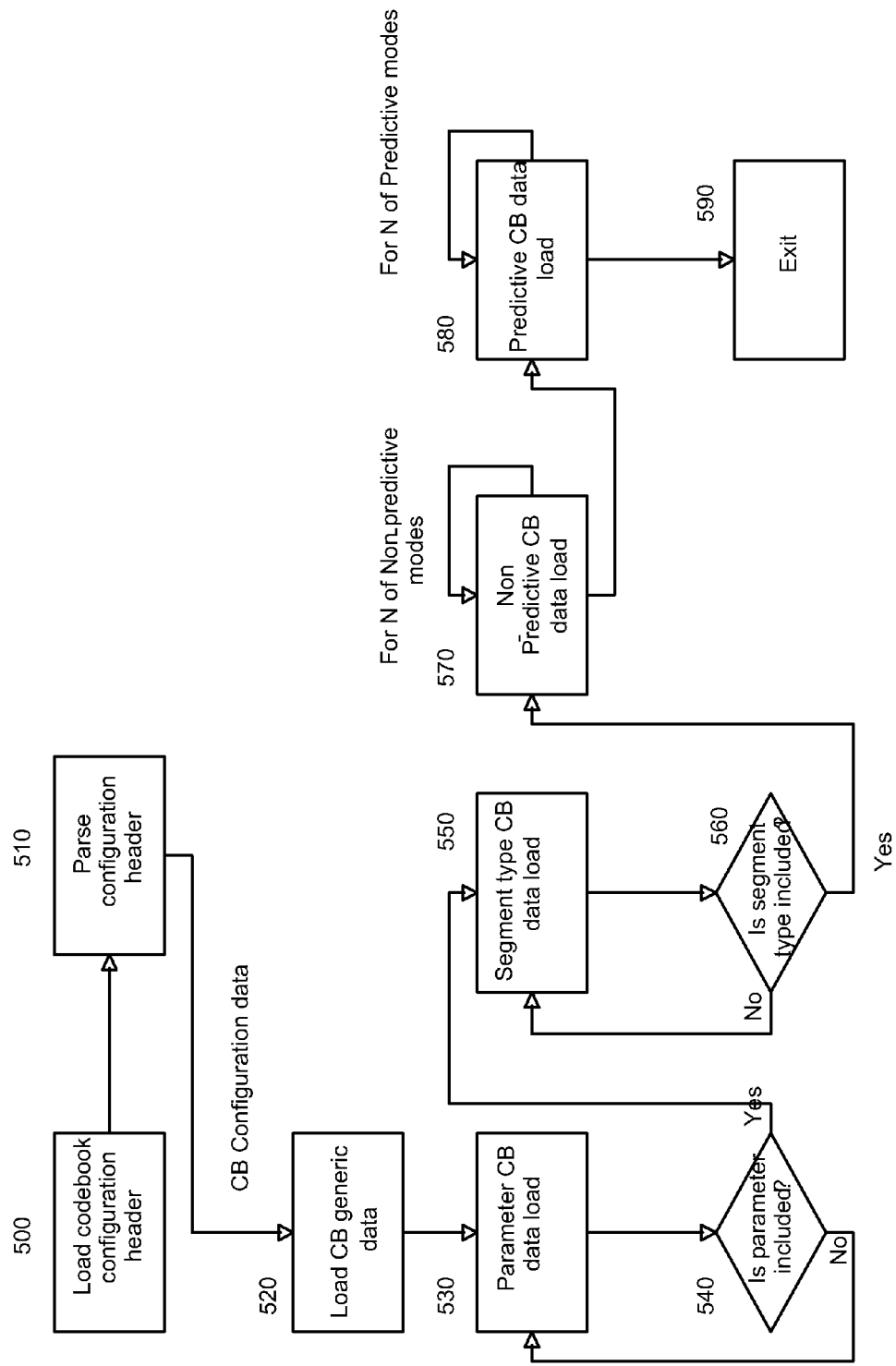
FIG. 5 illustrates a process of updating dynamic quantizers according the various embodiments of the present invention.

FIG. 5 illustrates a process of updating dynamic quantizers according to the various embodiments of the present invention. It should be noted that CB, as in FIG. 4, refers to codebook (including possible predictors) and N denotes a number of instances. At 500, a codebook configuration header is loaded into a speech coder. At 510, the codebook configuration header is parsed to extract CB configuration data. The CB generic data is loaded at 520 utilizing the CB configuration data. At 530, parameter CB data is loaded. At 540, it is determined whether any parameter(s) is included. If not, the process returns to 530. If a parameter(s) is included at 540, then the segment type CB data is loaded at 550. A determination is made at 560 to determine whether a segment type(s) is included. If a segment type(s) is not included, then the process is returned to 550. If a segment type(s) is included, the process continues to 570, where non-predictive CB data is loaded. The loading of non-predictive CB data is repeated for each identified non-predictive mode instance, N. At 580, predictive CB data is loaded. As at 570, the predictive CB data is loaded for each predictive mode instance, N. At 590, the process is completed and exited.

The various embodiments of the present invention provide various advantages over conventional quantizer structures. Speech coder output quality is maximized in applications where codebook data can be stored in addition to the actual binary formatted data, e.g., in text-to-speech applications. As indicated above, run-time updating of quantizers is enabled. In addition, each parameter's quantizer can be updated independently, as well as the subquantizers of each parameter. Different predictive and/or non-predictive codebooks modes can be utilized, while the loading of codebooks is not fixed into any build configuration. Updates for ROM-based codecs are enabled without a need to re-program the flash memory of the device. Lastly, downloadable codec updating is also enabled.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software implementations of the present invention could be accomplished with standard programming techniques with rule based logic and other logic to accomplish the various steps The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
    storing data representing a quantizer configuration header in a binary format in a non-transitory memory, wherein the quantizer configuration header comprises quantizer data, wherein the binary format is utilized as an additional data during initialization of a coder;
    receiving an input signal; and
    quantizing each parameter of the input signal according to quantizer data specified within the quantizer configuration header associated with each parameter, wherein the quantizer data relates to a dynamic quantizer structure and configuration for at least one of the quantized parameters of the input signal.

2. The method of claim 1, wherein the quantizer configuration header precedes codebook data in the binary format.

3. The method of claim 1, wherein the quantizer data relates to a dynamic quantizer structure and configuration for each of the quantized parameters of the input signal.

4. The method of claim 3, wherein the quantizer data includes predictor data.

5. The method of claim 1, wherein the coder is comprised, in part, of a default codebook configuration.

6. The method of claim 1, wherein the quantizer data comprises at least one of:
    at least one codebook for at least one parameter of the input signal, and the quantizer configuration header.

7. The method of claim 1, wherein a common codebook is accessed during quantization for at least one segment type within at least one parameter of the input signal.

8. The method of claim 1, wherein the quantizer configuration header comprises, for each parameter:
    an inclusion flag, a common codebook for all segment types flag, a segment type inclusion flag, a number of non-predictive modes and a number of predictive modes for each segment type, a number of stages for each non-predictive and predictive mode, and a stage size in bits for each stage.

9. The method of claim 1, wherein the quantizer data can be at least one of updated while the coder is operating and independently updated.

10. A computer program product embodied on a non-transitory computer-readable medium, comprising computer code configured to perform the processes of claim 1.

11. An apparatus, comprising:
    a processor; and
    a memory unit operatively connected to the processor and including:
        computer code for storing data representing a quantizer configuration header in a binary format in a non-transitory memory, wherein the quantizer configuration header comprises quantizer data, wherein the binary format is utilized as an additional data during initialization of a coder;
        computer code for receiving an input signal; and
        computer code for quantizing each parameter of the input signal according to quantizer data specified within the quantizer configuration header associated with each parameter, wherein the quantizer data relates to a dynamic quantizer structure and configuration for at least one of the quantized parameters of the input signal.

12. The apparatus of claim 11, wherein the quantizer data relates to a dynamic quantizer structure and configuration for each of the quantized parameters of the input signal.

13. A method, comprising:
    receiving, from a coder device binary formatted data as additional data utilized during initialization of the coder device, wherein the binary formatted data comprises data including quantized input signal data possessing a plurality of parameters and a quantizer configuration header;
    parsing the quantizer configuration header to extract quantizer data associated with each quantized parameter of the quantized input signal data; and
    accessing at least one codebook associated with the quantizer data to output each quantized parameter representing original input signal data,
    wherein the quantizer data relates to a dynamic quantizer structure and configuration for at least one of the quantized parameters of the input signal.

14. The method of claim 13, wherein the data precedes codebook data in the binary formatted data.

15. The method of claim 13, wherein the codebook data is shared by at least two parameters.

16. The method of claim 13, wherein the quantizer data relates to a dynamic quantizer structure and configuration for each of the quantized parameters of the input signal.

17. The method of claim 16, wherein the quantizer data includes predictor data.

18. The method of claim 13, wherein the coder is comprised, in part, of a default codebook configuration.

19. The method of claim 13, wherein the quantizer data comprises at least one of:
    at least one codebook for at least one parameter of the input signal, and the quantizer configuration header.

20. The method of claim 13, wherein a common codebook is accessed during quantization for at least one segment type within at least one parameter of the input signal.

21. The method of claim 13, wherein the quantizer configuration header comprises, for each parameter:
    an inclusion flag, a common codebook for all segment types flag, a segment type inclusion flag, a number of non-predictive modes and a number of predictive modes for each segment type, a number of stages for each non-predictive mode, and a stage size in bits for each stage.

22. The method of claim 13, wherein the quantizer data can be at least one of updated while the coder is operating and independently updated.

23. A computer program product embodied on a non-transitory computer-readable medium, comprising computer code configured to perform the processes of claim 13.

24. An apparatus, comprising:
    a processor; and
    a memory unit operatively connected to the processor and including:
        computer code for receiving, from a coder device, binary formatted data as additional data utilized during initialization of the coder device, wherein the binary formatted data comprises data including quantized input signal data possessing a plurality of parameters and a quantizer configuration header;

computer code for parsing the quantizer configuration header to extract quantizer data associated with each quantized parameter of the quantized input signal data; and computer code for accessing at least one codebook associated with the quantizer data to output each quantized parameter representing original input signal data, wherein the quantizer data relates to a dynamic quantizer structure and configuration for at least one of the quantized parameters of the input signal.

25. The apparatus of claim 24, wherein the quantizer data relates to a dynamic quantizer structure and configuration for each of the quantized parameters of the input signal.

26. An encoder, comprising:

means for storing data representing a quantizer configuration header in a binary format in a non-transitory memory, wherein the quantizer configuration header comprises quantizer data, wherein the the binary format is utilized as an additional data during initialization of a coder;

means for receiving an input signal; and means for quantizing each parameter of the input signal according to quantizer data specified within the quantizer configuration header associated with each parameter, wherein the quantizer data relates to a dynamic quantizer structure and configuration for at least one of the quantized parameters of the input signal.

27. A decoder, comprising:

means for receiving, from a coder device, binary formatted data as additional data utilized during initialization of the coder device, wherein the binary formatted data comprises data including quantized input signal data possessing a plurality of parameters and a quantizer configuration header;

means for parsing the quantizer configuration header to extract quantizer data associated with each quantized parameter of the quantized input signal data; and means for accessing at least one codebook associated with the quantizer data to output each quantized parameter representing original input signal data, wherein the quantizer data relates to a dynamic quantizer structure and configuration for at least one of the quantized parameters of the input signal.

* * * * *